April 21, 1931.  C. C. FARMER  1,801,851
MAGNETIC BRAKE DEVICE
Filed March 24, 1928  2 Sheets-Sheet 1
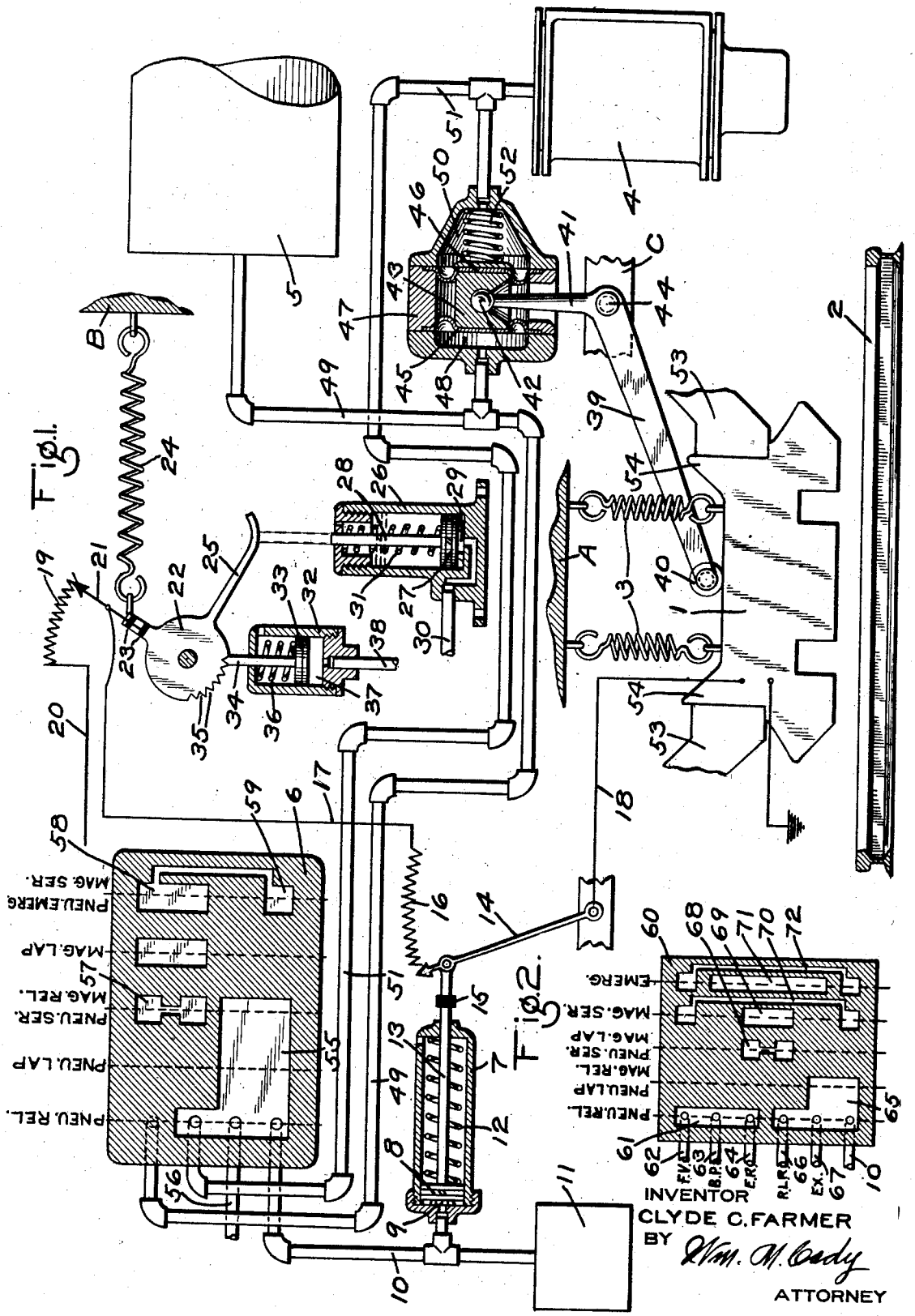
INVENTOR
CLYDE C. FARMER
BY
Wm. M. Cady
ATTORNEY

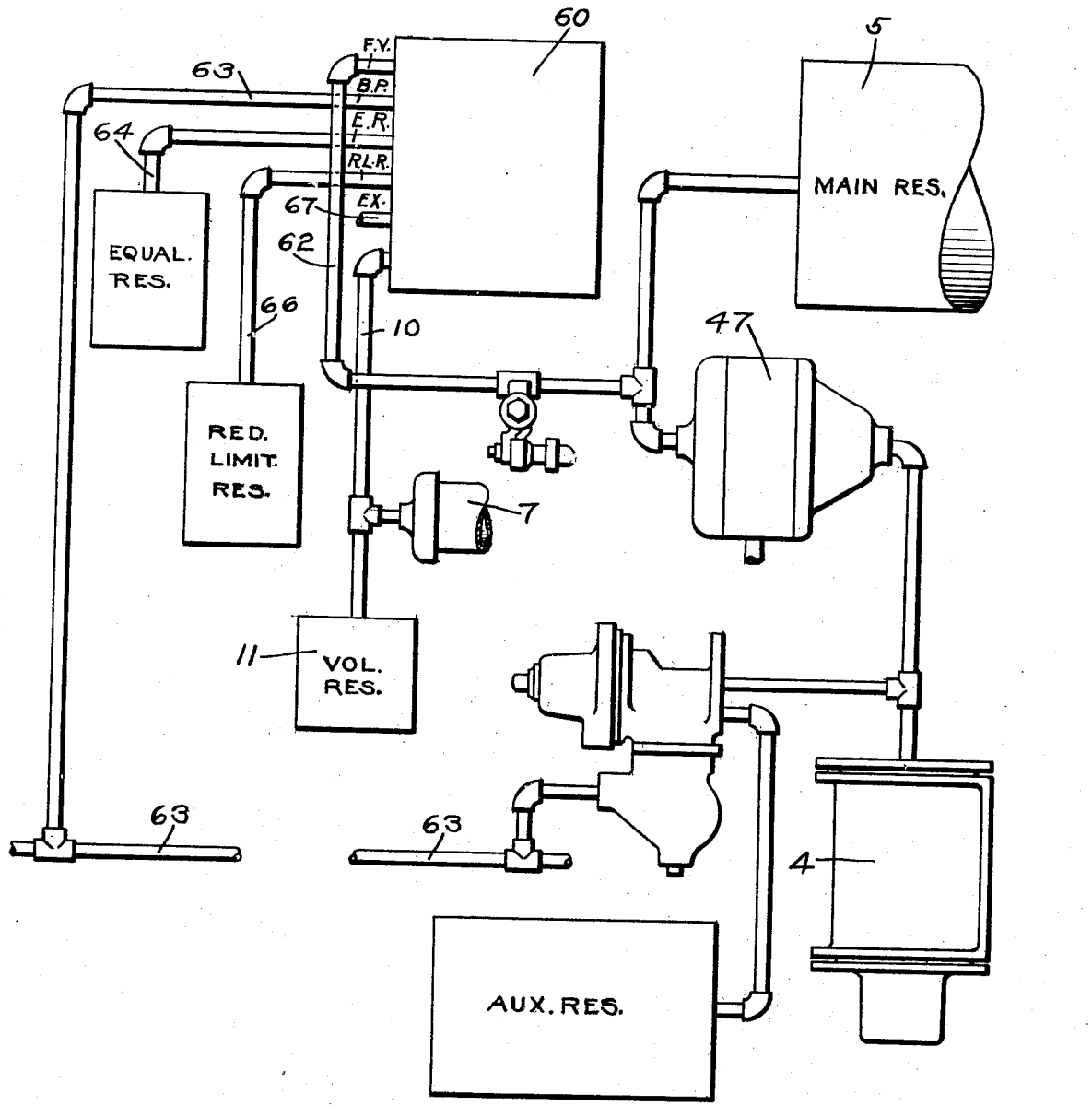

Patented Apr. 21, 1931

1,801,851

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

MAGNETIC-BRAKE DEVICE

Application filed March 24, 1928. Serial No. 264,323.

This invention relates to magnetic brakes of the type employing a magnetic brake shoe adapted to engage the rail, and more particularly as combined with a fluid pressure brake.

One object of my invention is to provide a magnetic brake and means for varying the magnetic pull of the brake in proportion to the load on the car.

Another object of my invention is to provide a combined magnetic brake and fluid pressure brake in which the magnetic pull is varied according to the degree of pressure with which the fluid pressure brakes are applied and also according to the load on the car.

Other objects and advantages will appear in the following more detailed description of the invention.

In the accompanying drawing, Fig. 1 is a diagrammatic view, partly in section, of a combined magnetic and fluid pressure brake equipment embodying my invention;—Fig. 2 illustrates the diagrammatic layout of a brake valve device for controlling the brakes automatically instead of by straight air, as shown in Fig. 1; and Fig. 3 a diagrammatic view, showing the brake apparatus connected to a brake valve device of the type shown in Fig. 2.

As shown in the drawing, a magnetic brake shoe 1 is provided, which is normally held suspended above each rail 2 by springs 3, secured to a portion A of the car truck. The fluid pressure brake includes a brake cylinder 4, a main reservoir 5, and a brake valve device, a development of the slide valve of which is indicated by the reference numeral 6.

For regulating the supply of current to the energizing coils (not shown) of the brake shoe 1, according to the pressure with which the fluid pressure brakes are applied, a cylinder 7 is provided which contains a piston 8, having the chamber 9 at one side connected to a pipe 10 leading to the seat of the brake valve slide valve, the pipe 10 being preferably connected to a volume reservoir 11. The chamber at the opposite side of the piston 8 contains a coil spring 12 which acts on said piston and urges same toward the left.

Carried by piston 8 is a stem 13, which is pivotally connected to a rotatable contact arm 14, a section 15 of insulating material being interposed in the stem, to insulate the arm 14 from the cylinder device. When the arm 14 is rotated, it contacts with a resistance coil 16 having one terminal connected to a wire 17, the contact arm being connected to a wire 18, which is connected to the energizing coils of the magnetic brake shoe 1.

For varying the current supply to the magnetic brake shoe 1 in proportion to the load on the car, a variable resistance coil 19 is provided, having one terminal connected to a current supply wire 20. A contact arm 21, connected to wire 17, is adapted to engage the coil 19 and said arm is carried by a rotatable member 22, the arm 21 being secured to said member by blocks 23 of insulating material.

The member 22 is movable with the car body and a spring 24 is connected at one end to said member and at the other end to a portion B of the car body. The member 22 is provided with an operating arm 25 and disposed below the arm 23 and carried by the car truck is a cylinder 26 containing a piston 27. Said piston is provided with a stem 28 adapted to engage the arm 25 upon movement of piston 27.

The piston chamber 29 is connected to a pipe 30 which is supplied with fluid under pressure whenever the car doors are opened and a coil spring 31 in the chamber at the opposite side of the piston urges the piston 27 downwardly. The cylinder 26 is carried by the car truck, so that there will be a relative movement of the member 22 and the arm 25 carried by the car body, with respect to the cylinder 26, according to the degree with which the car springs are compressed by the load on the car.

For locking the member 22 in its adjusted position, a piston cylinder 32 may be provided, which contains a piston 33 having a stem 34, the end of which stem is adapted to engage one of a plurality of notches 35 in the member 22. The piston 33 is subject on one side to the pressure of a spring 36 and the chamber 37 at the opposite side is connected to a pipe 38. When the car doors are closed, the pipe 38 is charged with fluid under pressure.

The brake shoe 1 is normally held suspended a distance from the rail 2 and means are provided for shifting the brake shoe to engagement with the rail upon applying the fluid pressure brake, which may comprise a bell crank having the end of one arm 39 provided with a roller 40 adapted to engage the upper face of the brake shoe and having the end of the other arm 41 provided with a ball shaped portion 42 which engages in a spherical recess in a movable block 43, the bell crank being fulcrumed on a pin 44, carried by a portion C of the car truck.

The block 43 is supported by two flexible diaphragms 45 and 46 mounted in a casing 47 and disposed at the opposite sides of the block. The chamber 48 at one side of the diaphragm 45 is connected to a pipe 49, leading to the main reservoir 5. The chamber 50 at the outer face of diaphragm 46 is connected to a pipe 51, leading to the brake cylinder 4. A coil spring 52 in chamber 50 acts on the diaphragm 46. The chamber intermediate the diaphragms 45 and 46 is open to the atmosphere.

In order to maintain the brake shoe 1 against relative longitudinal movement with respect to the car, vertical guiding means may be provided comprising guide members 53 carried by the car truck and having vertical guide faces adapted to engage corresponding faces of guide portions 54 carried by the brake shoe 1.

In operation, with the brake valve in release position, as shown in the drawing, the brake cylinder 4 is connected to the atmosphere, through pipe 51, cavity 55 in the brake valve slide valve and exhaust pipe 56, so that the fluid pressure brakes are held released. Pipe 10 is also connected through cavity 55 with the exhaust pipe 56, so that piston chamber 9 is at atmospheric pressure, permitting the spring 12 to maintain piston 8 at its left hand position, as shown, in which the stem 13 holds the contact arm 14 out of contact with the resistance coil 16, so that current is not supplied to the energizing coils of the brake shoe 1.

With the car running, the car doors are held closed by fluid under pressure and fluid under pressure is thus supplied to pipe 38 and to piston chamber 37. Piston 33 is therefore maintained in its upper position, causing the stem 34 to engage a notch 35 of the sistance coil 19 is cut into the circuit of the subject to atmospheric pressure, so that With the car doors closed, the pipe 30 is magnetic brake shoe.

its empty car position, so that all of the repiston 27 is maintained in its lower position, member 22 and thereby lock said member against rotation.

The member 22 is shown in the drawing in as shown, with the stem 28 held out of engagement with the arm 25. The clearance space between the end of the stem 28, when the piston is in its lower position, and the arm 25, is such as to prevent possible engagement due to jolting of the car when running along the road.

When the brake valve is moved to pneumatic service position, fluid under pressure is supplied from the main reservoir pipe 49, through cavity 57 in the brake valve slide valve to brake cylinder pipe 51 at a service rate. In this position, the piston 8 remains connected to the atmosphere through cavity 55, so that piston 8 is not operated to shift the contact arm 14 so as to close the circuit for supplying current to the brake shoe 1. The diaphragms 45 and 46 are not operated, since the diaphragm 45 is subject to fluid at main reservoir pressure, unless the brake cylinder pressure acting on the diaphragm 46 should be increased nearly to main reservoir pressure, so as to permit the spring 52 to shift the diaphragms.

When the car has been brought to a stop, the car doors are opened, and fluid under pressure is then supplied to pipe 30, while fluid under pressure is vented from pipe 38. The venting of fluid from pipe 38, permits movement of piston 33 by the spring 36, so that the stem 34 is moved out of engagement with the member 22. Fluid under pressure supplied from pipe 30 to piston 27 shifts the piston upwardly so that the stem 28 engages the arm 25. If the load on the car is increased, the car body will move downwardly, compressing the car springs a corresponding amount and the relative movement thus caused between the cylinder 26 and the member 22 will cause the arm 25 to be rotated so that a portion of the resistance of the coil 19 is cut out, corresponding with the load on the car. When the car is started, the car doors are closed, so that fluid under pressure is vented from pipe 30, permitting the piston 27 and stem 28 to be shifted to the inactive position, as shown in the drawing, while fluid under pressure is supplied to pipe 38 and piston 33. Piston 33 then shifts the stem 34 into engagement with a notch 35 of the member 22, so that said member is locked in its adjusted position.

When the brakes have been applied by fluid under pressure to the limit of pressure carried in the main reservoir and it is desired to apply the brakes to a greater extent, the brake valve is turned to the magnetic service position. In this position, fluid under pressure is supplied from the main reservoir pipe 49 through cavity 58 in the brake valve slide valve and connected cavity 59 to pipe 10, so that fluid under pressure is supplied to piston 8. The pressure of fluid supplied to said piston depends upon the time the brake valve is left in magnetic service position, the timing being facilitated by the volume reservoir 11. The piston 8 is moved out against spring 12 a distance proportional to the pressure of fluid supplied to chamber 9 and the contact arm 14 is shifted to close the circuit through the coil 16 to the magnetic shoe 1, and to cut out resistance of the coil to correspond with the movement of the piston.

The increase in fluid pressure in the brake cylinder 4 to substantially that in the main reservoir permits the spring 52 to act so as to shift the diaphragm 46 to the left. The corresponding movement of the block 43 rocks the bell crank, so that the arm 39 operates through the roller 40 to depress the brake shoe into engagement with the rail.

Current is supplied to the energizing coils of the magnetic brake shoe 1 as above described, in proportion to the movement of the contact arm 14, the movement of which is under the control of the operator and also in proportion to the load on the car as governed by the position of the contact arm 21.

If the brake valve is moved from magnetic service position to the magnetic lap position, the further flow of fluid under pressure to the volume reservoir 11 and to the piston chamber 8 is cut off and the magnetic brake will exert a magnetic pull dependent upon the position of the contact arm 14 as determined by the pressure of fluid supplied by operation of the brake valve device, and the position of the contact arm 21, as determined by the load on the car.

The magnetic braking force may be further increased by again moving the brake valve to magnetic position, so as to increase the pressure of fluid acting on piston 8, thereby causing the further movement of the contact arm 14 so as to cut out of the brake shoe circuit, more of the resistance coil 16, and the operation may be repeated to increase the magnetic pull up to the point at which all the resistance coil is cut out of the circuit.

The magnetic service position may also be the fluid pressure emergency position, so that when the brake valve is turned to this position either initially or after a service application of the brakes, the fluid pressure in the brake cylinder 4 will be quickly built up to the full pressure of the main reservoir 5 and at the same time, the magnetic brake shoe will be operated to provide magnetic braking action, when the brake cylinder pressure has been increased to the full pressure available, in much the same manner as in the case of a magnetic service application.

The above equipment has been described in connection with a direct fluid pressure brake, in which fluid under pressure is supplied by the brake valve device directly to the brake cylinder, to effect an application of the brakes. The invention may also be employed in connection with an automatic fluid pressure brake of the usual type in which a triple or similar valve device is operated upon a reduction in brake pipe pressure for supplying fluid under pressure from an air reservoir to the brake cylinder.

With an automatic fluid pressure brake equipment, the brake valve connections may be as shown in Fig. 2, the slide valve port arrangement being represented diagrammatically by the reference numeral 60. In the pneumatic release position of the brake valve, a cavity 61 connects feed valve pipe 62 with the brake pipe 63, and also with the usual equalizing reservoir pipe 64. Also in this position, cavity 65 connects pipe 66, leading to a reduction limiting reservoir (not shown) with an exhaust pipe 67, the pipe 10 leading to the magnetic brake resistance controlling device of Fig. 1, being also connected through said cavity, with exhaust pipe 67.

The brake pipe 63 of the well known automatic brake is thus charged with fluid under pressure in the usual manner in release position. In pneumatic service position, the equalizing reservoir pipe 64 is connected through cavity 68 with the reduction limiting reservoir pipe 66, so that fluid under pressure is vented from the equalizing reservoir to the reduction limiting reservoir. The usual equalizing discharge valve mechanism (not shown) is then operated in the well known manner to effect a reduction in brake pipe pressure, and a consequent application of the brakes.

In magnetic service position, the equalizing reservoir pipe 64 is connected through cavity 69 with the reduction limiting reservoir pipe 66, so as to continue the pneumatic application in magnetic service position, and pipe 10 is connected through cavity 70 with feed valve pipe 62, so that fluid under pressure is supplied from the feed valve (not shown) to the piston 8, the operation then being as described in connection with the Fig. 1 construction.

In emergency position, the brake pipe 63 is connected through cavity 71 directly with exhaust pipe 67, so as to effect a sudden reduction in brake pipe pressure and a consequent pneumatic emergency application of the brakes, and the magnetic brake is caused to operate by the connection of feed valve pipe 62 through cavity 72 with the pipe 10.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a magnetic brake shoe, of means operable for varying the resistance in the energizing circuit of said shoe, car doors, and means operated when the car doors are opened for operating said resistance varying means in proportion to the load on the car.

2. The combination with a magnetic brake shoe, of means adjustable to regulate the amount of resistance in the energizing circuit of said brake shoe and means operative according to the load on the car for adjusting said resistance regulating means.

3. The combination with a magnetic brake, of means adjustable according to the load on the car for regulating the current supplied to energize said brake and means under the control of an operator for varying the current supplied to said brake.

4. The combination with a magnetic brake, of means for cutting resistance out of the energizing circuit of said brake in proportion as the load on the car is increased and manually controlled means for varying the resistance in said circuit.

5. In a combined fluid pressure and magnetic brake, the combination with a magnetic rail brake shoe normally held suspended above the rail, a brake cylinder, and a main reservoir, of means subject to the opposing pressures of the brake cylinder and the main reservoir for controlling the shifting of said brake shoe to engagement with the rail.

6. In a combined fluid pressure and magnetic brake, the combination with a magnetic rail brake shoe normally held suspended above the rail, a brake cylinder, and a main reservoir, of a spring and means subject to the pressure of the brake cylinder and said spring opposed by the pressure of the main reservoir for controlling the shifting of said brake shoe to the rail.

7. The combination with a magnetic brake, of means for regulating the current supplied to energize said brake and means operated upon opening a car door for adjusting said regulating means according to the load on the car.

8. The combination with a magnetic brake, of means for regulating the current supplied to energize said brake, means operated upon opening a car door for adjusting said regulating means to regulate the current supplied in proportion to the load on the car, and means operated upon closing the car door for locking said regulating means in its adjusted position.

9. In a combined fluid pressure brake and magnetic brake, the combination with a brake cylinder, a brake pipe, and a valve device operated upon a reduction in brake pipe pressure for supplying fluid under pressure to the brake cylinder, of a magnetic brake shoe and means operated upon a reduction in brake pipe pressure for closing the circuit through which said brake shoe is energized.

10. In a combined fluid pressure brake and magnetic brake, the combination with a brake cylinder, a brake pipe, and a valve device operated upon a reduction in brake pipe pressure for supplying fluid under pressure to the brake cylinder, of a magnetic brake shoe, means for varying the resistance in the magnetic brake shoe circuit according to the load on the car, and means operated upon a reduction in brake pipe pressure for closing the magnetic brake shoe circuit.

In testimony whereof I have hereunto set my hand.

CLYDE C. FARMER.